(12) United States Patent
Kashyap et al.

(10) Patent No.: US 8,548,606 B2
(45) Date of Patent: Oct. 1, 2013

(54) APPARATUS AND METHOD FOR MANAGING TASKS IN AN INDUSTRIAL PLANT

(75) Inventors: Naveen Kashyap, Karnataka (IN); Jin Song Qian, Singapore (SG); Ching Hua Joseph Lee, Singapore (SG)

(73) Assignee: Yokogawa Electric Corporation, Musashino-shi, Tokyo (JP)

( * ) Notice: Subject to any disclaimer, the term of this patent is extended or adjusted under 35 U.S.C. 154(b) by 354 days.

(21) Appl. No.: 12/891,392

(22) Filed: Sep. 27, 2010

(65) Prior Publication Data

US 2012/0078387 A1    Mar. 29, 2012

(51) Int. Cl.
*G05B 11/01* (2006.01)
(52) U.S. Cl.
USPC .......................................................... 700/17
(58) Field of Classification Search
USPC .......................................................... 700/17
See application file for complete search history.

(56) References Cited

U.S. PATENT DOCUMENTS

| | | | | |
|---|---|---|---|---|
| 6,115,643 | A | * | 9/2000 | Stine et al. ..................... 700/110 |
| 6,941,519 | B1 | * | 9/2005 | Jerome et al. .................. 715/744 |
| 7,562,026 | B2 | * | 7/2009 | DelMonego et al. ............. 705/2 |
| 8,108,656 | B2 | * | 1/2012 | Katragadda et al. .......... 712/215 |
| 8,185,903 | B2 | * | 5/2012 | Fulton et al. .................. 718/103 |
| 2004/0054997 | A1 | * | 3/2004 | Katragadda et al. .......... 718/102 |
| 2007/0185754 | A1 | * | 8/2007 | Schmidt ............................ 705/9 |
| 2010/0191568 | A1 | * | 7/2010 | Kashyap et al. .................. 705/9 |

* cited by examiner

*Primary Examiner* — Mohammad Ali
*Assistant Examiner* — Sivalingam Sivanesan
(74) *Attorney, Agent, or Firm* — Westerman, Hattori, Daniels & Adrian, LLP

(57) ABSTRACT

An apparatus for managing tasks in an industrial plant comprises a task generator for generating at least one task to be performed in the industrial plant; a task scheduler for assigning a priority to each of the at least one task by analyzing the information of the plant; and a communication module for exchanging task information with a mobile device. The information of the plant may comprise static information and dynamic information of the plant. Preferably, the at least one task may comprise an event task dynamically generated by the task generator.

19 Claims, 2 Drawing Sheets

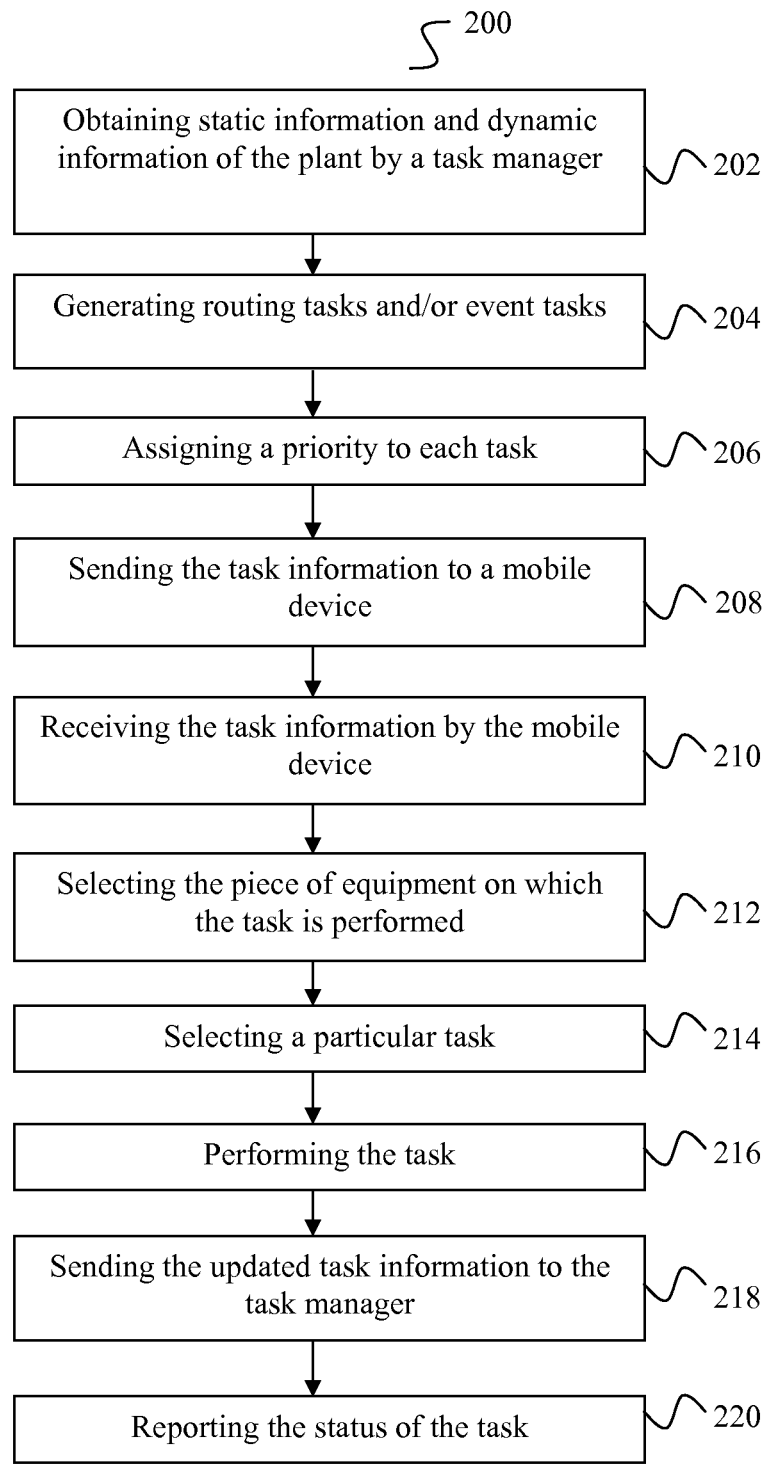

APPARATUS AND METHOD FOR MANAGING TASKS IN AN INDUSTRIAL PLANT

FIELD OF THE INVENTION

The present invention relates to a method and apparatus for managing tasks in an industrial plant and particularly, but not limited to, a method and apparatus for managing tasks for field operation and maintenance in an industrial plant.

BACKGROUND

Field operation and maintenance are essential activities in an industrial plant, especially in a chemical plant. Manufacturing processes in such a plant are usually carried out in the field having many pieces of equipment, such as control valves, pipes, storage tanks etc. A control system, for example, a Distributed Control System (DCS), is typically used to monitor and control these processes, and field operation and maintenance are used to enhance the safety and reliability of the industrial plant, which are usually the most important concerns in such a plant. Field operators or maintenance workers usually perform a large number of actions or tasks in the field and cover a huge span of the equipment. In order to perform their duties in the field which may involve complicated procedures and steps, they usually bring papers with written instruction or information to the field, and use walkie-talkie to communicate with each other and/or control system operators stationed in the remote control centre. This causes inconvenience in their work and the communication between them is hardly documented.

To facilitate the operation and maintenance work in the field, mobile devices are developed to store the digitized information of tasks to be performed and routes to be covered by the field operators or maintenance workers. However, these devices do not provide planning and optimization of the tasks and routes.

Further, the digitized information provided by these mobile devices is also static in nature and does not cater for the dynamic addition of the tasks. When possible abnormalities of the plant equipment are detected by an Asset Diagnostic System (ADS), such as a possible malfunction of a control valve, field operators or maintenance workers are usually required to perform certain tasks in addition to their routine tasks, such as investigation of the abnormality. This kind of situation is very common in the field, and in such circumstances, the static information thus results in a great level of rigidity and impedes efficient usage of resources.

Conventionally, different systems are employed for operation and maintenance functions, and different hardware and/or software tools are needed by different groups of people in the field. This also results in inefficiency in the operation of the industrial plant.

SUMMARY OF THE INVENTION

According to a first aspect, there is provided an apparatus for managing tasks in an industrial plant comprising a task generator for generating at least one task to be performed in the industrial plant; a task scheduler for assigning a priority to each of the at least one task by analyzing information of the plant; and a communication module for exchanging task information with a mobile device.

The information of the plant may comprise static information and dynamic information of the plant.

Preferably, the at least one task may comprise an event task dynamically generated by the task generator.

Preferably, the at least one task may further comprise a plurality of routine tasks.

The task information may comprise the priority of each of the at least one task; and a piece of equipment of the industrial plant on which each of the at least one task is to be performed.

The apparatus may further comprise an information storage module for storing the task information.

The apparatus may further comprise a synchronization module for synchronizing the task information between the apparatus and the mobile device.

According to a second aspect, there is provided a mobile device for managing tasks in an industrial plant comprising a communication module for receiving task information associated with at least one task to be performed in the industrial plant; and a user interface for displaying the task information to a user of the mobile device.

The mobile device may further comprise an equipment selector for selecting a piece of equipment of the industrial plant on which the at least one task is to be performed; a task selector for selecting a task among the at least one task; and a second communication module for controlling a piece of equipment of the industrial plant to perform the task automatically.

The communication module may be further arranged to send updated task information to an apparatus from which the task information is received.

The mobile device may further comprise an information storage module for storing the task information; and a synchronization module for synchronizing the task information between the mobile device and an apparatus from which the task information is received.

According to a third aspect, there is provided a method for managing tasks in an industrial plant, comprising obtaining static information and dynamic information of the plant; generating at least one task to be performed in the industrial plant; assigning a priority to each of the at least one task based on the static information and dynamic information of the plant; and sending the task information to a mobile device;

Preferably, the at least one task may comprise an event task dynamically generated based on the dynamic information of the plant.

The at least one task may further comprise a plurality of routine tasks.

The method may further comprise selecting a piece of equipment on which each of the at least one task is to be performed; selecting a task among the at least one task; using the mobile device to control a piece of equipment to perform the task automatically; and receiving updated task information from the mobile device.

BRIEF DESCRIPTION OF THE DRAWINGS

Embodiments of the invention will now be described, for the sake of example only, with reference to the accompanying drawings, in which:

FIG. 2 is an illustration of the general work flow of an exemplary embodiment of the apparatus of FIG. 1.

DETAILED DESCRIPTION OF THE EMBODIMENTS

Figure 1:
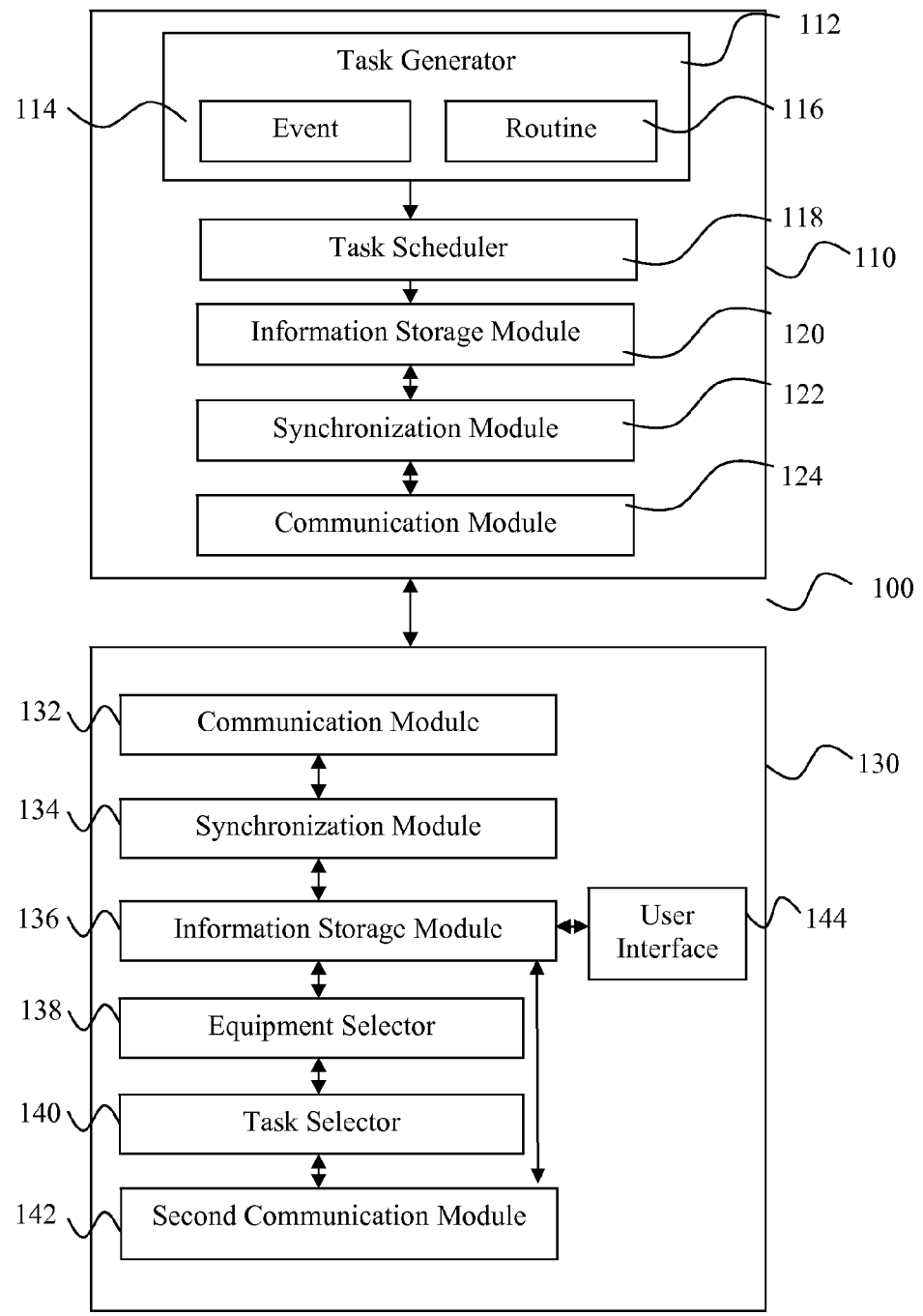
FIG. 1 is a block diagram of an exemplary embodiment of an apparatus for managing tasks in an industrial plant.

FIG. 1 illustrates one exemplary embodiment 100 of an apparatus for managing tasks in an industrial plant having a task manager 110. The task manager 110 is normally located in the control centre of the industrial plant and is usually interfaced with a DCS, an ADS and/or other systems. It creates and prioritizes tasks to be performed by a field operator or maintenance worker and sends the tasks to a mobile device 130. The mobile device 130 can be brought to the plant field by the field operator or maintenance worker as a tool and is specially designed to be explosion proof to ensure the safe operation of the plant.

To create and manage tasks in the industrial plant, certain information of the plant has to be gathered and ready to be used by the task manager 110. This information may include GPS location information of the equipment in the field and priorities of the equipment according to the importance. Optionally, other information, such as RFID tag information of the equipment, equipment routes, work shift plan and operation and maintenance historical data, may also be provided to the task manager 110. Such information is static and can be gathered beforehand and stored in a database of the task manager 110 or other databases which can be readily accessed by the task manager 110.

A task generator 112 is used to generate tasks, and includes an event task generator 114. The event task generator 114 is subscribed to the DCS and/or ADS which are able to detect abnormalities of the equipment dynamically. If a possible abnormality is detected and registered as an event by the ADS, the event task generator 114 receives this dynamic event information and uses it to generate at least one event task pertaining to this possible abnormality for the field operator or maintenance worker to do certain actions in the field, for example, to investigate the condition of the equipment or to tackle with the abnormality. The event tasks are generated on the fly based on the dynamic information provided so that when a critical abnormality is identified, the associated tasks can be created immediately and provided to the field operator or maintenance worker in charge.

Preferably, the task generator 112 is provided with a routine task generator 116 which generates routine tasks by utilizing the static information of the industrial plant. These routing tasks may include daily patrol tasks, data acquisition tasks, tasks need to be carried out on a periodic basis, and other foreseeable tasks. Unlike the event tasks which are generated dynamically based on the dynamic information, the routine tasks are normally generated once in a particular time frame since the routine tasks depend on the static information of the industrial plant, which usually does not change in a short time frame.

A task scheduler 118 is included in the task manager 110, capable of prioritizing the tasks created from both the event task generator 114 and the routine task generator 116 through an Operations Optimization (OR) algorithm. The task scheduler 118 assigns a priority to each task by analyzing the static information of the plant and/or the real time information of the plant. The priority levels can be configured as HIGH, MEDIUM or LOW, or any other reasonable configurations. The information used by the task scheduler 118 may but does not necessarily include priorities of the equipment on which the tasks are performed, work shift plan, equipment routes, operation and maintenance historical data, information of the abnormalities of the equipment, and priorities of the abnormalities.

For example, an abnormality of a control valve is detected and triggers the generation of an event task of further investigating the control valve in the field. The task scheduler 118 checks the priority of the abnormality which indicates a critical abnormality, and checks the priority of the control valve which shows that it is a critical control valve, and checks the maintenance historical data which shows an indication of possible air leaking one week ago. Based on the above information, the event task is assigned by the task scheduler 118 a HIGH priority.

Preferably, an information storage module 120 is provided to store task information including the tasks, the priorities of the tasks and the equipment on which the tasks are performed. It may also include equipment routes and information on how the tasks are performed.

The prioritized tasks with other task information are then synchronized to the mobile device 130 through a synchronization module 122 and a communication module 124 in the task manager 110, and a synchronization module 134 and a communication module 132 in the mobile device 130. The communication between the task manger 110 and the mobile device 130 can be wireless and/or by cables.

The mobile device 130 may be provided with an information storage module 136 to store the task information received from the task manager 110. It may provide the information to its user via a user interface 144, which is normally a display.

Optionally, if the piece of the equipment in the field on which a task is performed, or the target piece of equipment, is mounted with a RFID tag, the field operator or maintenance worker is able to use the mobile device 130 to read the RFID tag to identify the target piece of equipment. Otherwise, an equipment selector 138 may be optionally implemented to select a target piece of equipment automatically based on the GPS location information of equipment, equipment routes, the role of the user of the mobile device 130, and the location of the user. With the target piece of equipment identified or selected, a task selector 140 may also be provided by the mobile device 130 to select a task automatically for its user among a list of the tasks associated with the target piece of equipment. The selection may be based on information such as work shift plan, the role of the user, information of the target piece of equipment, operation and maintenance historical data, and priorities of the tasks. The automatic selection eliminates the inconvenience caused by manually selecting a task on a handheld device in an open area.

After the task need to be performed is selected, the mobile device 130 provides its user with detailed instructions to help him complete the task on the target piece of equipment. If the target piece of equipment is smart enabled through Foundation Fieldbus H1 (FF-H1) or Highway Addressable Remote Transducer (HART) software, the task can be performed automatically by connecting the mobile device 130 with the target piece of equipment via a second communication module 142 of the mobile device 130. Otherwise, the field operator or maintenance worker performs the task manually by following the instructions or steps displayed by the user interface 144.

After the completion of a particular task, the task information may be updated and then synchronized to the task manager 110 through the synchronization module 134 and the communication module 132. The updated task information may relate to the status of the task and/or the result of the task. Thus, Key Performance Indicators (KPIs) of the task may be calculated and visualized, and a report on the task can be prepared for documentation. If after the completion of the task, an abnormality of the target piece of equipment is found, or the possible abnormality is confirmed and cannot be rectified by the field operator or maintenance worker, the task manager 110 is able to notify the control system operator by sending an alter after receiving the information from the mobile device 130.

Several mobile devices 130 can be used to receive the task information from the task manager 110. To manager a number of mobile devices 130, the task manager 110 may optionally be configured to identify each mobile device 130 by the role of its user and transmit to the particular mobile device only the tasks relevant to the user of the particular mobile device 130.

Preferably, each mobile device 130 may be configured based on the role of its user so that only the tasks relevant to its user are active and able to be displayed, selected or performed.

The general work flow 200 of the exemplary embodiment 100 is illustrated in FIG. 2. After the task manager 110 receives the information of the plant 202, which may include static information and/or dynamic information of the plant, tasks, which may be routine tasks and/or event tasks, are generated 204 and each is assigned a priority 206. The tasks information is then sent to a mobile device 130, 208. After receiving the task information 210, the mobile device 130 selects the target piece of equipment, routes the user to the piece of equipment, and if possible, allows the user to read the RFID tag mounted on the target piece of equipment to get further information 212. A task associated with the target piece of equipment is then selected automatically 214 and the user of the mobile device 130 either performs the task manually or uses the mobile device to perform the task automatically by following the instructions provided 216. After the completion of the task, the updated task information is then sent back to the task manager 110, 218. If required, the KPI data of the task may then be calculated and visualized; a report on the task may be generated for documentation; and an alert may be raised 220. The field operator or maintenance worker is able to carry on doing the next task with the aid of the mobile device 130.

It should be appreciated that the invention has been described by way of example only and that various modifications in design and/or detail may be made without departing from the spirit and scope of this invention.

We claim:

1. An apparatus for managing tasks in an industrial plant, comprising:
 a task generator for generating at least one task to be performed in the industrial plant;
 a task scheduler for assigning a priority to the at least one task by analyzing information of the plant; and
 a communication module for exchanging task information with a mobile device,
 wherein the task scheduler analyses information of the industrial plant by checking priority of an abnormality detected in the industrial plant, checking priority of an equipment associated with the abnormality, and checking maintenance historical data associated with the equipment,
 wherein the at least one task further comprises a plurality of routine tasks, and
 wherein the task information comprises the priority of each of the routine tasks.

2. The apparatus according to claim 1, wherein the information of the industrial plant comprises static information and/or dynamic information of the plant.

3. The apparatus according to claim 1, wherein the at least one task comprises an event task dynamically generated by the task generator.

4. The apparatus according to claim 1, wherein the task information comprises a piece of equipment of the industrial plant on which the at least one task is to be performed.

5. The apparatus according to claim 1 further comprising an information storage module for storing the task information.

6. An apparatus according to claim 1 further comprising a synchronization module for synchronizing the task information between the apparatus and the mobile device.

7. A mobile device for managing tasks in an industrial plant having a task manager, the task manager includes a task scheduler, the mobile device comprising:
 a communication module for receiving task information associated with at least one task to be performed in the industrial plant; and
 a user interface for displaying the task information to a user of the mobile device,
 wherein the task scheduler assigns a priority to the at least one task, the task scheduler assigns the priority by analyzing information of the plant, and the task scheduler analyses information of the plant by checking priority of an abnormality detected in the industrial plant, checking priority of an equipment associated with the abnormality, and checking maintenance historical data associated with the equipment,
 wherein the at least one task further comprises a plurality of routine tasks, and
 wherein the task information comprises the priority of each of the routine tasks.

8. The mobile device according to claim 7 further comprising an equipment selector for selecting a piece of equipment of the industrial plant on which the at least one task is to be performed.

9. The mobile device according to claim 7 further comprising a task selector for selecting a task among the at least one task.

10. The mobile device according to claim 7 further comprising a second communication module for controlling a piece of equipment of the industrial plant to perform the at least one task automatically.

11. The mobile device according to claim 7, wherein the communication module is further arranged to send updated task information to an apparatus from which the task information is received.

12. The mobile device according to claim 7 further comprising an information storage module for storing the task information.

13. The mobile device according to claim 12 further comprising a synchronization module for synchronizing the task information between the mobile device and the apparatus from which the task information is received.

14. A method for managing tasks in an industrial plant, comprising the steps of:
 obtaining static information and/or dynamic information of the plant; generating at least one task to be performed in the industrial plant;
 assigning a priority to the at least one task based on static information and/or dynamic information of the industrial plant; and
 sending task information to a mobile device,
 wherein the step of assigning a priority to the at least one task comprises:
 checking priority of an abnormality detected in the industrial plant;
 checking priority of an equipment associated with the abnormality; and
 checking maintenance historical data associated with the equipment,
 wherein the at least one task further comprises a plurality of routine tasks, and
 wherein the task information comprises the priority of each of the routine tasks.

15. The method according to claim 14, wherein the at least one task comprises an event task dynamically generated based on the dynamic information of the industrial plant.

16. The method according to claim 14, further comprising selecting a piece of equipment on which each of the at least one task is to be performed.

17. The method according to claim 14, further comprising selecting a task among the at least one task.

18. The method according to claim 14, further comprising using the mobile device to control a piece of equipment on which each of the at least one task is to be performed to perform the task automatically.

19. The method according to claim 14, further comprising receiving updated task information from the mobile device.

* * * * *